United States Patent [19]

Ciaccio

[11] Patent Number: 5,038,857
[45] Date of Patent: Aug. 13, 1991

[54] METHOD OF DIFFUSION BONDING AND LAMINATED HEAT EXCHANGER FORMED THEREBY

[75] Inventor: Michael P. Ciaccio, Rockford, Ill.

[73] Assignee: Sundstrand Corporation, Rockford, Ill.

[21] Appl. No.: 540,276

[22] Filed: Jun. 19, 1990

[51] Int. Cl.⁵ .......................... F28F 3/08; B23K 31/02
[52] U.S. Cl. ..................................... 165/167; 228/174; 228/183; 165/164
[58] Field of Search ....................... 165/164, 167, 908; 228/174, 183, 193

[56] References Cited

U.S. PATENT DOCUMENTS

| | | | |
|---|---|---|---|
| 3,390,447 | 7/1968 | Mears | 228/174 |
| 3,441,996 | 11/1966 | Boothe | 29/890.09 |
| 3,477,504 | 11/1969 | Colyer et al. | 165/164 |
| 3,487,520 | 1/1970 | Lenhart et al. | 29/890.039 |
| 4,156,459 | 5/1979 | Kusuda et al. | 165/167 |
| 4,347,897 | 9/1982 | Sumitomo et al. | 165/167 |
| 4,494,171 | 1/1985 | Bland et al. | 361/386 |
| 4,559,580 | 12/1985 | Lufty | 361/385 |
| 4,566,625 | 1/1986 | Moe | 228/265 |
| 4,665,975 | 5/1987 | Johnston | 165/167 |
| 4,880,055 | 11/1989 | Niggemann et al. | 165/167 |
| 4,934,454 | 6/1990 | Van Dyke et al. | 165/164 |

FOREIGN PATENT DOCUMENTS

| | | | |
|---|---|---|---|
| 90592 | 6/1982 | Japan | 165/166 |
| 1484124 | 8/1977 | United Kingdom | 228/183 |

*Primary Examiner*—John Rivell
*Assistant Examiner*—L. R. Leo
*Attorney, Agent, or Firm*—Antonnelli, Terry, Stout & Kraus

[57] ABSTRACT

Leakage of fluid from a heat exchanger and fluid mixing in the case of a two fluid compact high intensity cooling heat exchanger are prevented by diffusion bonded areas of the heat exchanger formed using small locally raised borders which extend about the fluid passage or passages of the heat exchanger to form raised contact portions that experience locally high stresses during diffusion bonding thereby insuring material flow and complete bonding. The thickness of the locally raised borders is the same as or slightly greater than the tolerance of the rolled sheet material used to form the laminates of the heat exchanger whereby local deviations in thickness of the thin laminates will not result in non-bonded areas.

12 Claims, 2 Drawing Sheets

METHOD OF DIFFUSION BONDING AND LAMINATED HEAT EXCHANGER FORMED THEREBY

TECHNICAL FIELD

The present invention relates to an improved method of diffusion bonding metal laminates of a heat exchanger and a heat exchanger produced thereby wherein diffusion bonding is accomplished to prevent leaks or commingling of two fluids even with local deviations in thickness of the laminates being bonded.

BACKGROUND ART

Diffusion bonding is dependent upon clamping pressure, temperature, time, surface finish, material properties, and amount of surface contamination and oxidation. Hence, it is art at best. Variations in the thickness of the metals being diffusion bonded can result in unwanted non-bonded areas.

Compact high intensity coolers or heat exchangers (CHIC) are known. Unlike conventional heat exchangers, the former can efficiently handle relatively high heat fluxes in a small volume with relatively low power requirements for pumping a heat exchange fluid, see for example U.S. Pat. No. 4,559,580. These heat exchangers comprise a series of plates or laminates including alternating orifice plates and baffle plates. The orifice plates have coolant flow impingement orifices extending therethrough. U.S. Pat. No. 4,494,171 discloses another example of an impingement cooling apparatus for heat liberating device.

A CHIC heat exchanger may have layers, e.g. its lamination or plates, as thin as 0.004 inch thick. A small local deviation in the thickness of these layers may be enough to cause a leak because the diffusion bonded connections between the respective layers are not continuous. It is nearly impossible to detect internal areas of non-bonding in these heat exchangers. Nevertheless, external leakage is not acceptable. Moreover, in two fluid systems, internal leakage of for example fuel and ethylene glycol, cannot be tolerated. Thus, there is a need for an improved method of diffusion bonding which can be employed in making heat exchangers such as CHIC heat exchangers for preventing both external and internal leakage of fluid circulated in the heat exchanger by ensuring continuous diffusion bonds in critical areas.

U.S. Pat. No. 3,441,996 discloses a method of manufacturing laminated fluid amplifiers wherein the laminations of the fluid amplifier can be diffusion bonded. U.S. Pat. No. 4,566,625 discloses a method for diffusion welding particularly applicable for welding pipe sections of a pipeline for offshore transportation of gas and oil wherein the joint is configured so that a high surface pressure occurs along the periphery of the joint at the beginning of the method.

DISCLOSURE OF INVENTION

An object of the present invention is to provide an improved method of diffusion bonding and a laminated heat exchanger formed thereby which avoid the aforementioned problems in producing reliable diffusion bonds, particularly diffusion bonds between relatively thin sheet metal laminates of a laminated structure as in a CHIC heat exchanger.

These and other objects of the invention are attained by the improved method of the invention for diffusion bonding a laminated heat exchanger. The method comprises providing a first metal laminate with at least one fluid passage which extends through the laminate and wherein at least a first surface of the laminate surrounding the at least one fluid passage has a small locally raised border extending about the at least one fluid passage as a raised contact portion which will experience locally high stresses during diffusion bonding of the first metal laminate to a second metal laminate. The first surface of the first metal laminate is then diffusion bonded to a second metal laminate at least along the locally raised border of the first metal laminate such that the locally raised border or contact portion experiences locally high stresses which aid in material flow for compensating for thickness variations in the laminates being bonded. As a result, the diffusion bond about the at least one fluid passage is continuous thereby preventing leakage of the fluid from the heat exchanger and/or between respective fluid passages of the heat exchanger.

In the disclosed, preferred embodiment of the invention the laminated heat exchanger is a CHIC type heat exchanger and the first metal laminate is an orifice plate of the CHIC type heat exchanger. The thickness of the first and second metal laminates, which illustratively can be formed of a copper alloy, is between 0.004 and 0.050 inch but the method of the invention applicability for diffusion bonding material of other thicknesses. Preferably, the first metal laminate is a rolled metal sheet material and the height of the locally raised border or contact portion above the first surface of the first metal laminate is selected to be equal to or greater than the possible thickness variation from the known rolling tolerance of the first metal laminate. In the illustrated embodiment, the height of the locally raised border is on the order of ten percent of the thickness of the first metal laminate.

Further, according to the method of the invention the at least one fluid passage is provided by a first chemical machining of the first metal laminate in the area of the at least one fluid passage to form the at least one fluid passage and thereafter the locally raised border is formed by chemically machining the first surface of the first laminate to reduce its thickness while the area for the locally raised border of the first surface is covered with a resistive material so it is not chemically machined or reduced in thickness. The width of the locally raised border is relatively small, 0.050 to 0.150 inch in the illustrated embodiment, for causing the locally high stresses during the diffusion bonding process to aid in the material flow, especially in critical bonding areas. The metal laminates of the heat exchanger are rectangular in shape in the illustrated embodiment with each of the sides of the laminates having a length of between 1 and 2.5 cm. The diffusion bonding is accomplished by pressing the first and second metal laminates together under a pressure of less than or equal to 250 psi and at a temperature between 25° and 100° C. below the melting temperature of the metal laminates for a period of two to six hours. More than two laminates could be simultaneously bonded together in forming the heat exchanger, if desired, where one or more of the laminates is provided with the raised contact portion or border, at least in critical areas.

From the description of the method of the invention, it is seen that the laminated heat exchanger of the invention comprises a first metal laminate with at least one fluid passage which extends through the laminate and a second metal laminate diffusion bonded to a surface of the first metal laminate by way a small locally raised border extending about the at least one fluid passage. The heat exchanger is a CHIC type heat exchanger in the illustrated embodiment where the width of the raised contact portion or border is 0.050 to 0.150 inch.

These and objects, features and advantages of the present invention will become more apparent from the following description when taken in connection with accompanying drawings, which show, for purposes of illustration only, one preferred embodiment in accordance with present invention.

BEST MODE FOR CARRYING OUT THE INVENTION

Figure 2:
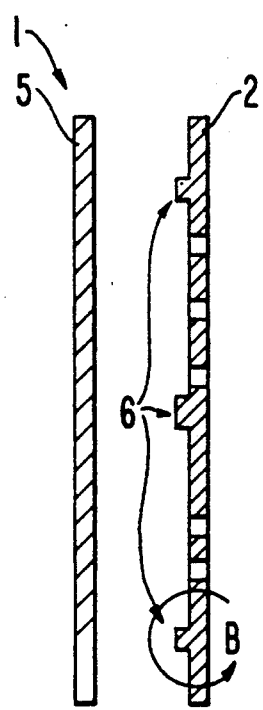
FIG. 2 is a cross-sectional view of the orifice plate taken along the line II—II in FIG. 1 illustrated alongside a spacer plate of the heat exchanger.

Referring now to the drawings, a portion of a CHIC heat exchanger 1 according to the invention is illustrated in cross-section in FIG. 2, in disassembled position before diffusion welding of the metal laminates of the heat exchanger. The heat exchanger 1 comprises a first metal laminate 2 which is an orifice plate or laminate formed of a rolled metal sheet of a copper alloy having fluid passages in the form of orifice holes 3 and fluid return slots 4 which extend through the laminate for conveying a fluid coolant during operation of the assembled heat exchanger. A second metal laminate 5 shown generally in FIG. 2 is also formed of rolled sheet metal, particularly a copper alloy and may include fluid passages as well, which are not shown.

The first and second metal laminates 2 and 5 are adapted to be diffusion bonded to one another in the completed CHIC heat exchanger 1. The CHIC heat exchanger laminates preferably have a thickness of between 0.004 and 0.050 inch, although other thicknesses could be employed. In the illustrated embodiment, the sheet material of each laminate is 0.025 inch thick with a rolling tolerance of the sheet being ±0.001 inch. As a result of this rolling tolerance, thickness variations of as much as 0.002 inch will occur along the surface of the laminates as shown in exaggerated form in FIG. 4A. In order to prevent non-bonding as a result of these small local deviations in thickness, according to the invention at least one of the two metal laminates 2 and 5 is provided with small locally raised borders 6 which preferably extend completely about the respective flow passages in the heat exchanger laminate defined by the groups of orifice holes 3 and the individual return slots 4, in the manner shown in FIG. 1. This provides raised contact portions which will experience locally high stresses during diffusion bonding thereby ensuring material flow and compensation for thickness variations during diffusion bonding of the first and second metal laminates.

Figure 1:
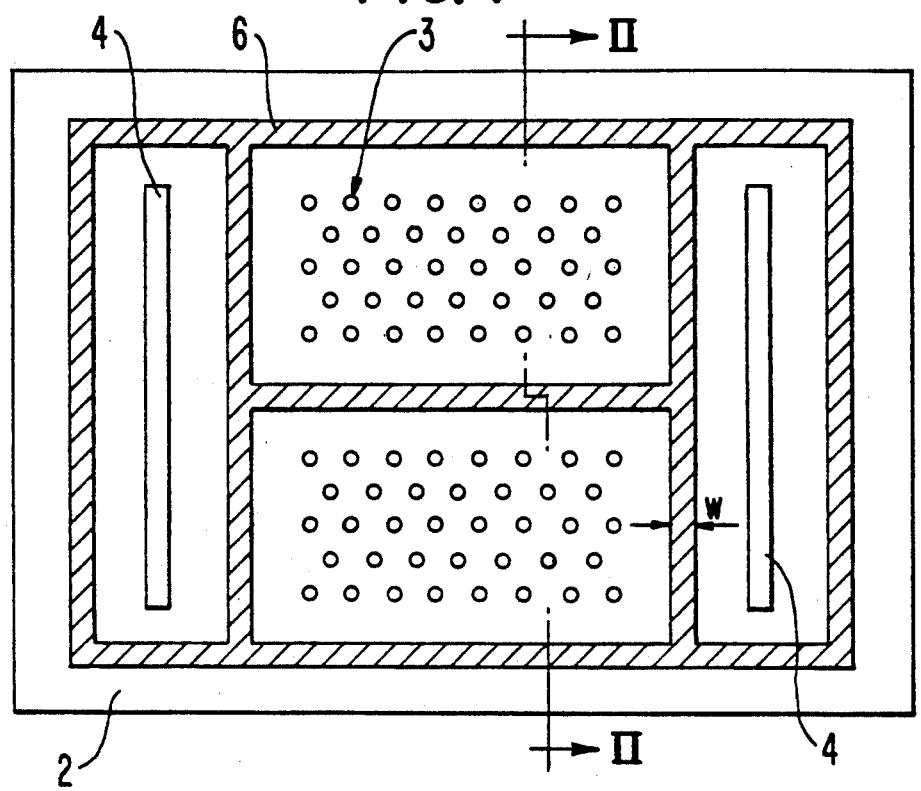
FIG. 1 is a top view of an orifice plate for a CHIC heat exchanger for diffusion bonding according to the method of the invention.

The method of forming the first metal laminate 2 involves applying a conventional photoresist material to the copper sheet except for the areas where the orifice holes 3 and slots 4 are to be formed. Chemical machining of the copper sheet as in an acid bath is then performed to form the holes 3 and slots 4 through the copper sheet. Thereafter, the chemically resistant material is reapplied only over the crosshatched areas illustrated in FIG. 1 and the remainder of the upper surface of the metal sheet shown in FIG. 1 is chemically machined as in an acid bath to reduce the thickness of the sheet except where the chemically resistant material has been applied. As a result, the chemical machining leaves the relatively narrow borders 6 about the respective fluid passages defined by each slot 4 and each group of orifice holes 3. After removing the chemical resistant material the first metal laminate 2 ca be joined by diffusion bonding to another sheet metal laminate of the heat exchanger, namely sheet 5 shown in FIG. 2. The surface of sheet 5 adjacent laminate 2 is planar as shown in FIG. 2 but it could also be formed with a complementary locally raised border. The metal sheet 5 in FIG. 2 is a spacer plate. The first and second metal laminates 2 and 5 are used in combination with other laminates, some or all of which may be provided with the small locally raised borders about the fluid passages therethrough for forming a CHIC heat exchanger of otherwise conventional design.

Figure 4A:
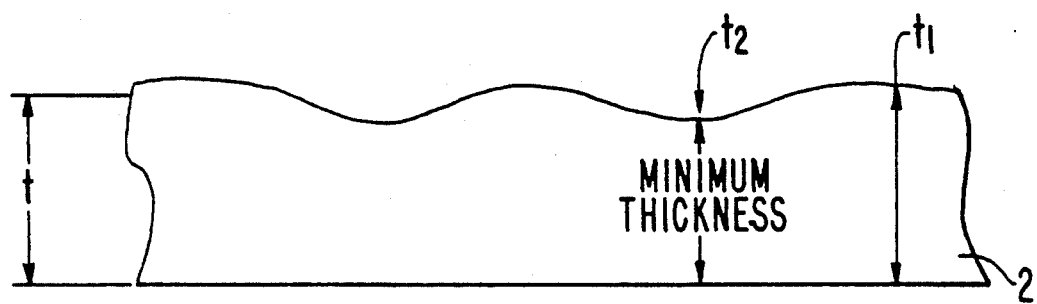
FIG. 4A is a cross-sectional view of a metal sheet or laminate to be diffusion bonded and illustrating in an exaggerated fashion the uneven thickness of the sheet.
Figure 4B:
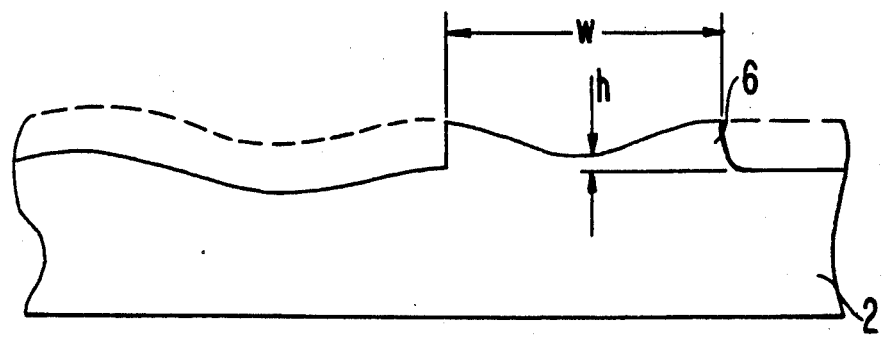
FIG. 4B is a view of the metal sheet or lamination of FIG. 4A after the raised border or contact portion has been formed thereon by thinning the surrounding portion of the top surface of the sheet by selective chemical machining according to the method of the invention.

The thickness of the rolled sheet of the first metal laminate 2, particularly the variations in the thickness thereof, are illustrated in FIG. 4A. As an example, where the sheet material has a nominal thickness of 0.025 inch and a rolling tolerance ± of 0.001 inch, the maximum thickness $t_1$ of the metal sheet will be 0.026 and the minimum thickness is 0.024 inch. Thus, the thickness variations along the surface of the metal sheet may be as large as 0.002 inch. According to the invention, to insure sufficient material for making contact and forming a diffusion bond during bonding, the small locally raised borders 6 of the metal sheet are formed to have a height h as shown in FIG. 4B of preferably 0.002 inch or slightly larger. A height h 10% of the sheet metal nominal thickness has been found to be suitable. The metal sheets 2 and 5 in the heat exchanger 1 of the example have a rectangular shape with the length along each side being within the range of 1 to 2.5 cm. The width w of the locally raised border 6 in the illustrated embodiment is 0.050–0.150 inch.

Figure 3:
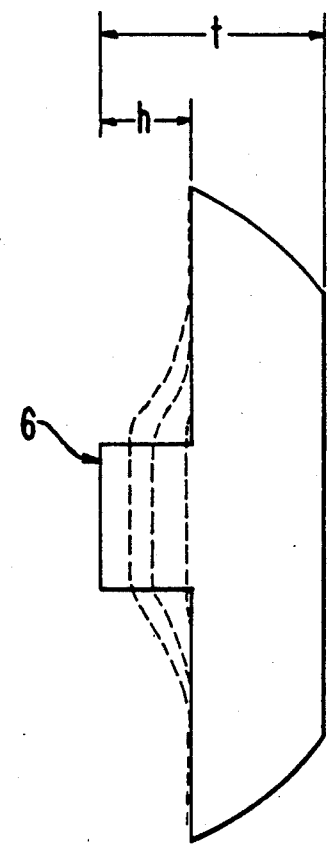
FIG. 3 is an enlarged view of a portion of the orifice plate of FIG. 2 within the circle B and illustrating a raised border or contact portion for facilitating diffusion bonding according to the invention.

The first and second metal laminates 2 and 5 as well as other metal laminates of the heat exchanger, not shown, are diffusion bonded to one another under the application of heat and pressure for an extended period of time to allow diffusion bonding to occur. Illustratively, the metal laminates can be compressed at a pressure of less than 250 psi and at a temperature of 25° to 100° C. below the melting temperature of the sheet metal laminates for a period of two to six hours. Under these conditions, the localized high stresses in the area of the small locally raised borders 6 aids in material flow in critical bonding areas for accommodating variations in thickness of the metal laminates. The dashed lines in FIG. 3 illustrate the flow of the raised border 6 during diffusion bonding.

While I have shown and described only one embodiment in accordance with the present invention, it is understood that the same is not limited thereto, but is susceptible to numerous changes and modifications as known to those skilled in the art. For example, laminated structures other than heat exchangers could be made by the method of invention. Therefore, I do not wish to be limited to the details shown and described herein, but intend to cover all such changes and modifications as are encompassed by the scope of the appended claims.

I claim:

1. A method of diffusion bonding a laminated heat exchanger comprising providing a first metal laminate with at least one fluid passage which extends through the laminate with at least a first surface of the laminate surrounding the at least one fluid passage having a small locally raised border extending about the at least one fluid passage as a raised contact portion which will experience locally high stresses during diffusion bonding of the first metal laminate to a second metal laminate, and diffusion bonding the first surface of the first metal laminate to a second metal laminate at least along the locally raised border of the first metal laminate, wherein at least the first metal laminate is a rolled sheet material and the height of the locally raised border above the first surface of the first metal laminate is equal to or greater than the rolling tolerance of the first metal laminate.

2. The method according to claim 1, wherein the laminated heat exchanger is a CHIC type heat exchanger and the first metal laminate is an orifice plate of the CHIC type heat exchanger.

3. The method according to claim 1, wherein the thickness of each of said first and second metal laminates is between 0.004 and 0.050 inch.

4. The method according to claim 1, wherein the height of the locally raised border is on the order of ten percent of the thickness of the first metal laminate.

5. The method according to claim 1, wherein at least first and second fluid passages are formed through the first metal laminate in spaced relation, the locally raised border extending about each of the first and second passages for separating the passages from one another after the diffusion bonding so that respective fluids flowed through the first and second passages in the heat exchanger do not commingle.

6. The method according to claim 1, wherein said at least one fluid passage is provided by a first chemical machining of the first laminate in the area for the at least one fluid passage to form the at least one fluid passage and thereafter the locally raised border is formed by chemically machining the first surface of the first laminate to reduce its thickness while the area for the locally raised border of the first surface is covered with a resistive material so it is not chemically machined or reduced in thickness.

7. A method of diffusion bonding a laminated heat exchanger comprising providing a first metal laminate with at least one fluid passage which extends through the laminate with at least a first surface of the laminate surrounding the at least one fluid passage having a small locally raised border extending about the at least one fluid passage as a raised contact portion which will experience locally high stresses during diffusion bonding of the first metal laminate to a second metal laminate, and diffusion bonding the first surface of the first metal laminate to a second metal laminate at least along the locally raised border of the first metal laminate, wherein the first metal laminate is a metal sheet material having a thickness variation, the height of the locally raised border is at least equal to the thickness variation of the sheet metal material of the first metal laminate and the width of the locally raised border is 0.050 to 0.150 inch for causing locally high stresses during the diffusion bonding to cause material flow of the raised border to compensate for the thickness variation.

8. The method according to claim 1, wherein the first and second metal laminates have a thickness between 0.004 and 0.050 inch and are rectangular in shape with each of the sides of the laminates having a length of between 1 and 2.5 cm.

9. The method according to claim 1, wherein the diffusion bond is accomplished by pressing the first and second metal laminates together under a pressure of $\leq 250$ psi and at a temperature of between 25° and 100° C. below the melting temperature of the metal laminates for two to six hours.

10. A laminated heat exchanger comprising a first metal laminate with at least one fluid passage which extends through the laminate and a second metal laminate diffusion bonded to a surface of the first metal laminate by way of a small locally raised border extending about the at least one fluid passage, said small locally raised border having a height sufficient to compensate for thickness variations in the first and second metal laminates, the width of the small locally raised border being relatively narrow such that localized high stresses occurred on the border during diffusion bonding which resulted in material flow in the border to accommodate variations in the thickness of the metal laminates, whereby said diffusion bond extending about the at least one fluid passage is a continuous bond which prevents fluid leakage.

11. The laminated heat exchanger according to claim 10, wherein the heat exchanger is a CHIC type heat exchanger.

12. The laminated heat exchanger according to claim 10, wherein the width of the border is 0.050 to 0.150 inch.

* * * * *